United States Patent Office 3,454,696
Patented July 8, 1969

3,454,696
ANTIBIOTICS 460 AND METHODS FOR THEIR PRODUCTION
Marvin J. Weinstein, East Brunswick, George M. Luedemann, Glen Ridge, Gerald H. Wagman, East Brunswick, and Joseph A. Marquez, Montclair, N.J., assignors to Schering Corporation, Bloomfield, N.J., a corporation of New Jersey
Continuation-in-part of application Ser. No. 574,108, Aug. 22, 1966. This application Feb. 19, 1968, Ser. No. 711,148
Int. Cl. A61k *21/00;* C12k *1/00*
U.S. Cl. 424—116     6 Claims

ABSTRACT OF THE DISCLOSURE

This invention relates to new compositions of matter exhibiting antobiotic activity produced by a hitherto undescribed variant of *Micromonospora chalcea,* said compositions being herein designated Antibiotics 460 and said variant being herein designated *Micromonospora chalcea* var. *flavida.* This invention also relates to methods for the production, isolation and separation of said Antibiotics 460.

---

Figure 1:
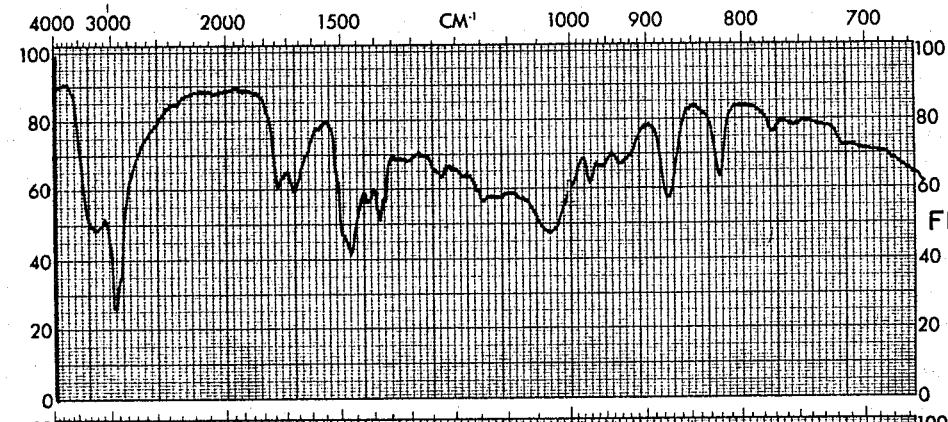

This application is a continuation-in-part of our copending application Ser. No. 574,108 filed Aug. 22, 1966, now abandoned.

This invention relates to new antibiotics, and to methods for their production, isolation, and purification. More specifically, this invention relates to new and useful antibiotics formed by the cultivation under controlled conditions of a hitherto undescribed variety of a species of the genus Micromonospora of the order Actinomycetales.

THE MICROORGANISM

A culture of living organisms of this undescribed variety has been deposited on an unrestricted basis and made a part of the stock culture collection of the United States Department of Agriculture, Northern Utilization Research and Development Division, Peoria, Ill., where it was designated NRRL 3222 and is available to the public upon request. This organism will hereinafter be referred to as *Micromonospora chalcea* var. *flavida (M. chalcea* var. *flavida)* and was originally isolated from a soil sample from New York State.

Microscopic examination of twenty-one day old cultures of *M. chalcea* var. *flavida* on a medium consisting of 3 percent NZ amine type A (Sheffield Chemical Co. Norwich, N.Y.), 1 percent dextrose and 1.5 percent agar, is characterized by exhibiting a long sparingly branched mycelium of approximately $0.5\mu$ in diameter. Spores are not abundant but are singly borne. They are oval to spherical, about $1.0\mu$ in diameter and tend to appear brownish.

Macroscopic examination of the same culture discloses good growth, no aerial mycelium and gives a plicate or folded appearance.

Colonies of *M. chalcea* var. *flavida* may be further characterized by their appearance and growth on various nutrient media. Table I, which follows gives the growth and color characteristics of *M. chalcea* var. *flavida* on some of the more widely used nutrient materials. The colony observations were made on 21 day old cultures. In the description of the color characteristics the following system and references are employed: The color designation consists of two designates. The first is the color name taken from the "Descriptive Color Name Dictionary" by Taylor, Knoche and Granville, published by the Container Corporation of America, 1950 (U.S.A.), with a color chip number corresponding to the color name, said chip number taken from the "Color Harmony Manual" 4th Edition, 1958, published by the Container Corporation of America, U.S.A. The second designate consists of a color name and number which refers to the synonym or near synonym found in the National Bureau of Standards Circular 553, Nov. 1, 1955 (U.S.A.).

TABLE I.—COLONY CHARACTERISTICS OF *M. CHALCEA* VAR. *FLAVIDA* ON VARIOUS MEDIA

Glucose asparagine agar:
    Growth _____ Fair.
    Color _____ Apricot—g4ga; light orange—52.
    Gelatin _____ Liquification occurs.
    Milk _____ Digested.
    Sucrose _____ Utilized.
    Starch _____ Hydrolyzed.
Bennett's agar:
    Growth _____ Fair, plicate furrowed.
    Color _____ Orange—g4La; strong orange—50.
Emerson's agar:
    Growth _____ Good, plicate.
    Color _____ Pastel orange—g4Ic; moderate orange—53.
Tomato paste-oatmeal agar:
    Growth _____ Good, furrowed.
    Color _____ Burnt orange—g5NC; strong reddish orange—35.
Glucose-yeast extract agar:
    Growth _____ Good, raised, plicate.
    Color _____ Brick red—g5NG; strong brown—55.
Potato slice:
    Growth _____ Good.
Czpek's agar:
    Growth _____ Fair.
Tyrosine [1] agar:
    Growth _____ Fair.
    Dissolving crystals __ Reddish-brown diffusing pigment.
    Peptone-iron [1] _____ No diffusing pigment.

[1] Observations made at 2, 7 and 14 days after Gordon and Smith, J. Bact. 69; 147.

*M. chalcea* var. *flavida* shows good growth at temperatures ranging from 26 to 37° C. and no growth at 50° C. It is aerobic and reduces nitrate to nitrite.

This organism shows good growth on such carbohydrate sources as glucose, arabinose, galactose, lactose, levulose, mannose, raffinose, starch, sucrose, xylose and and melibiose. It grows poorly, if at all, on media in which the sole carbohydrate is rhamnose, inositol, mannitol, sorbitol, ribose or glycerol.

TABLE II.—UTILIZATION OF NITROGEN SOURCES

| Nitrogen source containing 1% glucose by weight: | Growth characteristics |
|---|---|
| 0.5% Difco, yeast extract | Growth: good, plicate. Color: dark spice brown—g4PL; dark brown—59. |
| 1.0% NZ amine, Type A | Growth: fair, plicate. Color: rust tan—g5LE; strong brown—55. |
| 1% asparagine | Growth: poor, not definitive. |
| 1% glutamic acid | Do. |
| 1% sodium nitrate | Do. |
| 1% ammonium nitrate | Do. |

The invention herein disclosed relates to the use of *M. chalcea* var. *flavida* in the production of an antibiotic substance. This invention is not so limited as to exclude the use of variants thereof and mutants produced from the described organism by mutating agents such as high frequency radiation (X-ray, ultra-violet) actinophages and nitrogen mustard.

THE ANTIBIOTIC

*M. chalcea* var. *flavida* by controlled fermentation as described herein produces a complex mixture of antibiotic substances hereinafter referred to as the Antibiotic 460 Complex.

In order to produce the complex, *M. chalcea* var. *flavida* is grown under submerged aerobic conditions at temperatures ranging from 25 to 40° C. and for a time interval of 2 to 7 days. The media normally used are aqueous and contain quantities of carbon and nitrogen compounds assimilable by the organism. The alkalinity and acidity of said media is maintained in an equilibrated balance by the incorporation of calcium carbonate.

Exemplary of fermentation media utilizable by the microorganism are the following: Medium I, yeast extract (0.5% w./v.); fish solubles (0.1% w./v.), corn steep liquor (0.1% w./v.); lactose (3.0%) and calcium carbonate (0.1% w./v.); Medium II, beef extract (0.3% w./v.), tryptose (0.5% w./v.), dextrose (0.1% w./v.) and yeast extract (0.5% w./v.).

In general the fermentation is carried out for about 4 to 7 days under aerobic conditions at approximately 28° C. with agitation, and in one of the two media described above.

The antibiotic complex is removed from the mycelium by first acidifying the whole broth with strong acid, such as sulfuric acid, to a pH of about 2.0. The broth is filtered and neutralized with strong alkali, preferably sodium hydroxide. Ammonium oxalate is advantageously added to precipitate calcium as its sparingly soluble oxalate salt. The antibiotic is extracted by adsorption onto an IRC–50-type resin (in its sodio form). (Examples of suitable resins of the IRC–50-type may be found in the "Handbook of Chemistry and Physics," 42nd edition, Chemical Rubber Publishing Company, Cleveland, Ohio.) The antibiotic is eluted from the resin by acid treatment.

The crude antibiotic complex is separable into its components by means of several chromatographic systems. Table III gives the $R_f$ values of these components on two different paper chromatographic systems: (1) propanol-pyridine-acetic acid-water (15:10:3:12), commonly referred to as the PPAW system and (2) propanol-acetic acid-water (50:40:5) referred to as the PAW system.

TABLE III

| Fraction: | PPAW | PAW |
|---|---|---|
| 3 | 0.20 | 0.13 |
| 2 | 0.25 | 0.20 |
| 1 | 0.95 | 0.93 |

The antibiotic complex may be separated in usable quantities by column chromatography using silicic acid as the inert support medium. The separation is performed by eluting the column with a solvent mixture comprising essentially the following composition by volume: ethanol 20, acetic acid 8, ethyl acetate 8, water 8 and pyridine 4.

A typical column will yield three distinct products designated by us as Antibiotic 460 Fractions 1, 2 and 3 in the order of increasing polarity, i.e. decreasing mobility under the conditions used. Fractions 1 has bioautographic $R_f$ of approximately 0.95; usually requires from about 15 to 20 percent of the total eluate volume for elution and constitutes from about 75 to about 80 percent by weight of the total active material isolated. Fraction 2 has a bioautographic $R_f$ of approximately 0.25; usually requires from about 40 to about 42 percent of the total eluate volume for elution and constitutes from about 10 to about 15 percent by weight of the total active material isolated. Fraction 3 has a bioautographic $R_f$ of approximately 0.20; usually requires from about 40 to about 48 percent of the total eluate volume for elution and constitutes from about 10 to about 15 percent by weight of the total material isolated.

The following tables set forth data summarizing the chemical properties of the Antibiotic 460 Fractions 1, 2 and 3.

TABLE IV

| Chemical Tests | Fraction 1 | Fraction 2 | Fraction 3 |
|---|---|---|---|
| Ninhydrin | + | + | + |
| Starch-potassium iodide | − | + | + |
| Sakaguchi | − | − | − |

In Table IV (+) denotes a positive test and (−) denotes a negative one.

TABLE V

| Elemental Analyses | Fraction 1 | Fraction 2 | Fraction 3 |
|---|---|---|---|
| Carbon | 49.15 | 37.98 | 42.75 |
| Hydrogen | 7.65 | 6.82 | 6.93 |
| Nitrogen | 3.28 |  | 7.27 |
| Oxygen | 39.92 |  | 43.05 |

Antibiotic 460 Fractions 1, 2 and 3 have no discrete melting point discernible up to 300° C.

Antibiotic 460 Fraction 1 absorbs ultraviolet light and has a $\lambda_{max}$ at 270 m$\mu$, $\epsilon^{1\%}=18$. Antibiotic 460 Fractions 2 and 3 are transparent in the ultraviolet between 220 and 400 m$\mu$.

Infra-red spectrum

Figure 2:
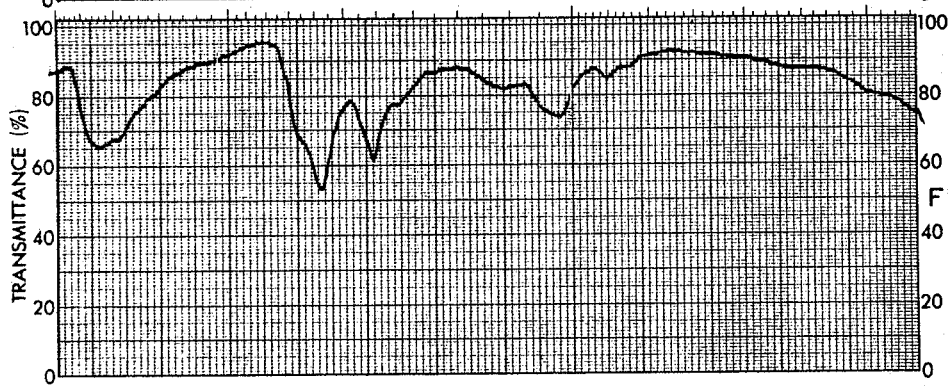
Figure 3:
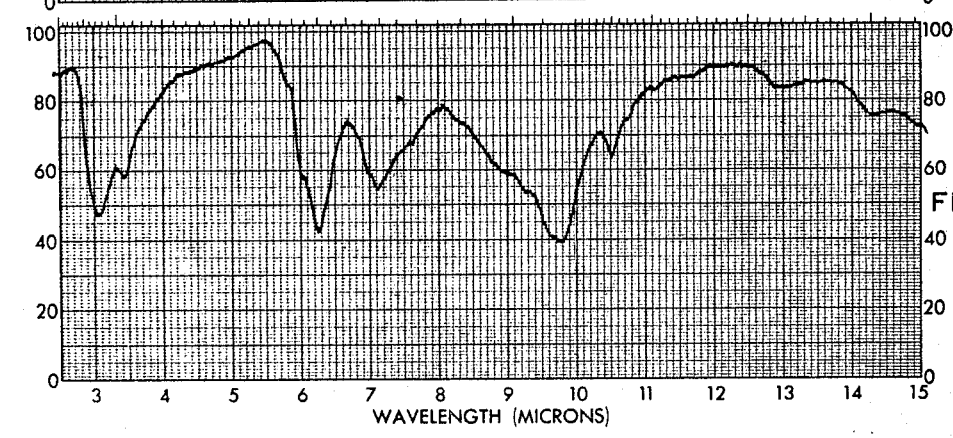

The infra-red spectra of Antibiotic 460 Fractions 1, 2 and 3 are reproduced in FIGURES 1, 2 and 3, respectively, their major peaks and strengths tabulated in Table VI. The absorption peaks are labeled S.=strong, M.=medium, W.=weak, B.=broad, Sh.=shoulder, (V.=very) and combinations retain their normal means, e.g. M.W.=medium to weak, V.S.=very strong.

TABLE VI.—INFRA-RED SPECTRA

| Fraction 1 | | Fraction 2 | | Fraction 3 | |
|---|---|---|---|---|---|
| Peak Location ($\mu$) | Peak Strength | Peak Location ($\mu$) | Peak Strength | Peak Location | Peak Strength |
| 3.12 | S. | 3.12 | M.B. | 3.06 | S.M. |
| 5.77 | M. | 5.82 | Sh. | 5.80 | Sh. |
| 6.01 | M. | 6.00 | Sh. | 6.01 | Sh. |
| 7.07 | M. | 6.33 | S. | 6.25 | S. |
| 7.32 | W. | 7.09 | M. | 6.97 | Sh. |
| 7.65 | V.W. | 7.48 | W. | 7.10 | M. |
| 8.13 | W. | 8.98 | W., V.b. | 8.92 | W. |
| 8.73 | W. | 9.75 | M.B. | 9.25 | W. |
| 9.70 | S.B. | 10.50 | M.W. | 9.75 | S. |
| 10.27 | M.W. | 10.80 | W. | 10.50 | M.W. |
| 10.45 | W. | | | | |
| 10.71 | W. | | | | |
| 11.40 | M.S. | | | | |
| 12.15 | M. | | | | |
| 12.92 | W. | | | | |

The following tables set forth data summarizing the biological properties of Antibiotic 460 Fractions 1, 2 and 3.

Biological in vitro spectrum

Antibiotic 460 Fractions exhibit in vitro activity as set forth in Table VII. The minimum inhibitory concentration is reported in mcg./ml. and was obtained using a medium consisting of nutrient broth 0.8 percent, yeast extract 0.3 percent, glucose 0.1 percent (this medium is used for all the Antibiotic 460 Fractions tested).

TABLE VII

| Fraction | MIC | | |
|---|---|---|---|
| | 1 | 2 | 3 |
| Organism: | | | |
| Bacillus subtilis ATCC 6633 | 2.5 | 2.5 | <5.0 |
| Diplococcus pneumoniae | 15.0 | 2.5 | 7.5 |
| Staphylococcus aureus ATCC 6538-P | 7.5 | 2.5 | <5.0 |
| Staphylococcus aureus DA 2040 [1] | 2.5 | 2.5 | <5.0 |
| Streptococcus pyogenes DA 21 [1] | >40.0 | >40.0 | 7.5 |
| Escherichia coli ATCC 10536 | 30.0 | >40.0 | 7.5 |
| Klebsiella pneumoniae DA 20 [1] | 15.0 | 2.5 | 7.5 |
| Proteus vulgaris DA 121 [1] | >40.0 | 7.5 | 7.5 |
| Pseudomonas aeruginosa ATCC 8689 | 30.0 | 7.5 | 7.5 |
| Salmonella schottmuelleri DA 10 [1] | 30.0 | 7.5 | 7.5 |

[1] DA is Schering Corporation's designation for its culture collection.

The members of the Antibiotic 460 complex are a potent group of antibiotic substances and, as the complex or as individual components, may be used to clean laboratory glassware, sterilize surgical instruments and the like. The 460 Antibiotics may also be used in combination with soaps and detergents to clean areas used for food preparation such as hospital kitchens, military mess halls and the like.

Individually, Fractions 1, 2 and 3 of the 460 Antibiotics find use as assay standards against certain organisms. Fraction 1 for example, may be used as a base line against which other potentially useful antibiotic substances are measured and in which *Staphylococcus aureaus* is the test organism. The results obtained would thus be a measure of the ratio of the activity of the potential antibiotic relative to that of Fraction 1. In a similar manner Fractions 2 and 3 may be used as assay standards against *Klebsiella pneumoniae* and *Escherichia coli*, respectively. Such standards would afford a facile method of determining the relative activity of antibiotic compounds.

The following procedure as set forth herein illustrates the best mode contemplated by the applicants for carrying out their invention and is not to be construed as limiting the scope thereof.

EXAMPLE 1

Preparation of Antibiotic 460 complex

GERMINATION

A. Inoculate 100 ml. of sterile Medium No. II contained in a 300 ml. Erlenmyer flask with *M. chalcea* var. *flavida* from an agar slant. Place the flask on a rotary shaker (250 to 275 r.p.m.) and grow the culture for 3 days at 35° C. This culture is sufficient to inoculate four 2-liter fermentations.

FERMENTATION

B. Transfer aseptically 25 ml. of the inoculum prepared above to a 2-liter Erlenmeyer flask containing 500 ml. of sterile Medium No. I. Place the flask on a rotary shaker and incubate the culture for 5 to 6 days at 28° C. maintaining the pH at approximate neutrality by the intermittent addition of calcium carbonate. Test the whole broth periodically during the 5 to 6 days interval to determine when peak activity against *S. aureus, S. lutea, B. subtilis* and *K. pneumoniae* is attained.

Acidify the whole broth to pH 2.0 with 6 N sulfuric acid and filter with the aid of a diatomaceous earth. Neutralize the filtrate with 6 N sodium hydroxide and add ammonium oxalate to precipitate the calcium in the medium as its sparingly soluble oxalate salt. Filter the suspension and discard the precipitated calcium oxalate.

ISOLATION

C. Suspend 5 to 6 grams of IRC-50 cationic resin sodio form in the filtrate and stir the suspension for one-half hour. Filter the suspension and repeat the adsorption step with 5 to 6 grams fresh resin. Filter the suspension, discard the filtrate and wash the combined resin free of residual broth. Suspend the resin in 50 ml. water and acidify to pH 2.0 with 3 N sulfuric acid with stirring. Maintain the pH at 2.0 for one-half hour and filter. Discard the resin, neutralize the filtrate and adsorb the antibiotic complex on 20 gm. of neutral 20 x 40 mesh activated carbon which has previously been washed free of sulfate ion. Wash the carbon with deionized water until the washes are free of sulfate ion as determined by testing the washes with barium chloride solution. Extract the antibiotic from the carbon by agitating vigorously for 1 hour in 120 ml. of a 1:1 mixture of 1 N sulfuric acid and methanol. Remove the carbon by filtration, concentrate the filtrate to 25 ml. and lyophilize to obtain 20 to 50 mg. of Antibiotic 460 complex.

EXAMPLE 2

Separation of Antibiotic 460 Fractions

Dissolve 420 mg. of the crude antibiotic complex in 20 ml. of water and add 5.0 g. silicic acid to absorb the solution. Dry the silicic acid in vacuuo and hold for further processing. Pack a chromatographic column of at least 3½ x 80 cm. with silicic acid to 72 cm. and add the antibiotic-silicic acid mixture from above to the top of the column. Pass the eluting solvent (prepared as described hereinbefore) through the column at the rate of 1.0 ml. per hour and collect the eluate in 2.0 ml. fractions. Monitor the column for antibiotic activity by moistening paper discs with eluate from each individual fraction, drying the disc in a stream of dry air, nitrogen or other non-reactive gas and testing against *S. aureus* and *E. coli* in the usual manner. Paper chromatograph a sample of the active fractions by ascending chromatography, using the PPAW system described above, and allowing 18 hours for the separation to occur. Dry the papers and bioautograph on separate plates against cultures of *S. aureus* and *E. coli* suspended in an agar medium. Combine the fractions in accordance with their paper chromatographic pattern as determined by bioautography. Concentrate the combined fractions to dryness in vacuo. Dissolve the dried fractions in water, filter and lyophilize the filtrates to obtain the individual Antibiotic 460 Fractions.

Although the antibiotics disclosed herein have been described above both generally and specifically as the free nitrogen bases, many modifications in the antibiotics will suggest themselves to those skilled in the art from a study of the foregoing description. It will be obvious, for example, that these basic antibiotics will form acid addition salts with both organic and inorganic acids. Exemplary of such salts are those formed with hydrochloric, sulfuric, phosphoric, toluenesulfonic, methanesulfonic and succinic acids. These salts are water soluble solids and possess the antibiotic properties of the bases, differing only in degree. They may be prepared by the titration of an aqueous solution of the free base with the requisite acid followed by lyophilization of the resulting solution.

Applicants consider such salts to be the full equivalent of the free bases disclosed above and to fall within the scope of this invention. The subject matter which applicants regard as their invention is particularly pointed out and distinctly claimed as follows.

We claim:

1. A composition of matter selected from the group consisting of Antibiotic 460 Fraction 1, Antibiotic 460 Fraction 2 and Antibiotic 460 Fraction 3;

Antibiotic 460 Fraction 1 being an organic substance
  having the following elemental analyses: C=49.15%, H=7.65%, N=3.28% and O=39.92%,
having a specific optical rotation as measured by the D line of sodium at 25° C. of +3.5° in water at 0.62% concentration,
being ninhydrin positive, Sakagushi and starch-potassium iodide negative,
having an ultraviolet absorption maximum at 270 mμ with $\epsilon^{1\%}$ in methanol equal to about 18,
having an infrared absorption spectrum substantially as shown in FIGURE 1, and, having an antibacterial spectrum including the bacteria enumerated in Table VII, Antibiotic 460 Fraction 2 being an organic substance having the following carbon and hydrogen analyses: C=37.98%, H=6.82%, being ninhydrin and starch-potassium iodide positive and Sakaguchi negative, having an infrared absorption spectrum substantially as shown in FIGURE 2, and having an antibacterial spectrum including the bacteria enumerated in Table VII;

Antibiotic 460 Fraction 3 being an organic substance having the following elemental analyses: C=42.75%, H=6.93%, N=7.27% and O=43.05%;

being ninhydrin and starch-potassium iodide positive and Sakaguchi negative, being transparent in the ultraviolet between 220 and 400 m$\mu$, having an infrared absorption spectrum substantially as shown in FIGURE 3, and, having an antibacterial spectrum including the bacteria enumerated in Table VII.

2. A composition of claim 1, said composition being Antibiotic 460 Fraction 1.

3. A composition of claim 1, said composition being Antibiotic 460 Fraction 2.

4. A composition of claim 1, said composition being Antibiotic Fraction 3.

5. A method for producing Antibiotics 460 as defined in claim 1 which comprises cultivating the microorganism *Micromonospora chalcea* var. *flavida* in an aqueous nutrient medium under submerged aerobic conditions until a composition of matter having substantial antibiotic activity is produced and separating said antibiotics therefrom.

6. A method according to claim 5 wherein after substantial antibiotic activity is produced the antibiotics are recovered by a sequence of steps comprising:

(a) acidifying the whole broth;
(b) separating the mycelium from the broth;
(c) neutralizing the mycelium-free broth; and
(d) separating the antibiotics from the broth as a resin adsorbate from which the antibiotic compositions of matter are isolated.

References Cited

UNITED STATES PATENTS 3,342,681   9/1967   Argoudelis et al.

ALBERT T. MEYERS, *Primary Examiner*

J. D. GOLDBERG, *Assistant Examiner*

U.S. Cl. X.R.

195—80; 424—118